United States Patent
Ahn et al.

(10) Patent No.: US 10,701,516 B2
(45) Date of Patent: Jun. 30, 2020

(54) METHOD FOR PROVIDING LOCATION INFORMATION AND APPARATUS THEREFOR

(71) Applicants: Samsung Electronics Co., Ltd., Suwon-si, Gyeonggi-do (KR); Korea Advanced Institute of Science and Technology, Daejeon (KR)

(72) Inventors: Sung Hwan Ahn, Seoul (KR); Byeong Cheol Moon, Daegu (KR); Suk Hoon Jung, Daejeon (KR); Dong Soo Han, Daejeon (KR); Kyung Shik Roh, Seongnam-si (KR); Suk June Yoon, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/469,466

(22) PCT Filed: Dec. 15, 2017

(86) PCT No.: PCT/KR2017/014899
§ 371 (c)(1),
(2) Date: Jun. 13, 2019

(87) PCT Pub. No.: WO2018/117554
PCT Pub. Date: Jun. 28, 2018

(65) Prior Publication Data
US 2019/0394615 A1 Dec. 26, 2019

(30) Foreign Application Priority Data
Dec. 19, 2016 (KR) .......................... 10-2016-0173903

(51) Int. Cl.
*H04W 4/02* (2018.01)
*H04B 17/318* (2015.01)
(Continued)

(52) U.S. Cl.
CPC .......... *H04W 4/023* (2013.01); *H04B 17/318* (2015.01); *H04W 64/003* (2013.01); *H04W 88/08* (2013.01); *H04W 84/12* (2013.01)

(58) Field of Classification Search
CPC ... H04W 4/023; H04W 64/003; H04W 88/08; H04W 84/17; H04W 84/12; H04B 17/318
(Continued)

(56) References Cited

U.S. PATENT DOCUMENTS 7,116,988 B2 * 10/2006 Dietrich ................ G01S 5/0221
455/456.1
2003/0220116 A1 * 11/2003 Sagefalk ............... G01S 5/0252
455/456.1
(Continued)

FOREIGN PATENT DOCUMENTS

KR 10-0932271 B1 12/2009
KR 10-2012-0010114 A 2/2012
(Continued)

OTHER PUBLICATIONS

Farshad et al., "A Microscopic Look at WiFi Fingerprinting for Indoor Mobile Phone Localization in Diverse Environments", 10 pages (Year: 2013).*

*Primary Examiner* — Mong-Thuy T Tran
(74) *Attorney, Agent, or Firm* — Jefferson IP Law, LLP

(57) ABSTRACT

A server may include a communication circuit communicating with a user terminal, storage including a fingerprint DB storing fingerprints corresponding to a plurality of points and a signal fluctuation probability DB, and a processor electrically connected to the communication circuit and the (Continued)

storage. The processor may be configured to store similarity between first signal strength and second signal strength, which are determined based on a probability that a pair of the first signal strength and the second signal strength received from a first AP occurs with respect to fingerprints corresponding to a first point, in the signal fluctuation probability DB, to obtain a fingerprint including signal strength received from the first AP, from the user terminal, and to determine a location of the user terminal based on the obtained fingerprint and the signal fluctuation probability DB.

15 Claims, 9 Drawing Sheets

(51) Int. Cl.
*H04W 64/00* (2009.01)
*H04W 88/08* (2009.01)
*H04W 84/12* (2009.01)

(58) Field of Classification Search
USPC .................................. 455/456.3, 456.1–456.7
See application file for complete search history.

(56) References Cited

U.S. PATENT DOCUMENTS

| | | | |
|---|---|---|---|
| 2010/0039929 A1* | 2/2010 | Cho | G01S 1/68 370/216 |
| 2012/0072106 A1 | 3/2012 | Han et al. | |
| 2014/0106773 A1* | 4/2014 | Li | H04W 64/00 455/456.1 |
| 2015/0005000 A1* | 1/2015 | Gyorfi | H04W 64/006 455/456.1 |
| 2016/0150380 A1* | 5/2016 | Han | H04W 4/30 455/456.1 |
| 2018/0332558 A1* | 11/2018 | Chan | H04W 64/00 |

FOREIGN PATENT DOCUMENTS

| | | |
|---|---|---|
| KR | 10-1178042 B1 | 8/2012 |
| KR | 10-2014-0119333 A | 10/2014 |
| KR | 10-2014-0146879 A | 12/2014 |
| KR | 10-2016-0018891 A | 2/2016 |
| KR | 10-2016-0076551 A | 7/2016 |

* cited by examiner

METHOD FOR PROVIDING LOCATION INFORMATION AND APPARATUS THEREFOR

TECHNICAL FIELD

Embodiments disclosed in the disclosure relates to a technology of indoor positioning.

BACKGROUND ART

A location-based service (LBS) refers to a service that provides location-dependent information such as road guide, surrounding facility information inquiry, traffic information, location search, or the like based on the location of a portable user terminal 100. For the purpose of providing the location-based service in the portable user terminal 100, it is necessary to grasp the location of the portable user terminal 100. For example, the technology for grasping the location of the portable user terminal 100 by using signals received from GPS satellites is widely used.

In addition, it is possible to estimate/measure the location of the portable user terminal 100 by using a wireless network. For example, a fingerprinting-based positioning scheme using the signal strength measured at a plurality of predefined reference locations may be used. In this case, the strength value/pattern of a wireless signal collected at each location may be referred to as a wireless local area network (WLAN) fingerprint at the corresponding location, and the database of fingerprints with each of which a reference location is tagged may be referred to as a radio map.

DISCLOSURE

Technical Problem

The conventional fingerprinting-based location positioning scheme is based on the assumption that the strength of the signal received at a specific point is always constant. However, in a real environment, the constant signal strength is not received due to the characteristic of the reflection, refraction, and scattering of a wireless signal. The fluctuation in the strength of the received signal may occur even at the same point based on the various propagation paths of a signal or the signal may not be received even at the same point. The error of the strength of the received signal causes the degradation of the accuracy of location measurement of a system.

Various embodiments of the disclosure may provide a method and an apparatus that measure a location in consideration of the fluctuation in the strength of the received signal and a non-reception signal.

Technical Solution

According to an embodiment disclosed in this disclosure, a server may include a communication circuit communicating with a user terminal, storage including a fingerprint DB storing fingerprints corresponding to a plurality of points and a signal fluctuation probability DB, and a processor electrically connected to the communication circuit and the storage. The processor may be configured to store similarity between first signal strength and second signal strength, which are determined based on a probability that a pair of the first signal strength and the second signal strength received from a first AP occurs with respect to fingerprints corresponding to a first point, in the signal fluctuation probability DB, to obtain a fingerprint including signal strength received from the first AP, from the user terminal, and to determine a location of the user terminal based on the obtained fingerprint and the signal fluctuation probability DB.

Moreover, according to an embodiment disclosed in this disclosure, a location measuring method of a server may include obtaining a fingerprint including a first signal strength value of a first AP, from a terminal, obtaining a score of each of a plurality of locations based on a similarity between the first signal strength value and signal strength values of the first AP included in fingerprints corresponding to a plurality of locations, and determining a location corresponding to the obtained fingerprint, based on the plurality of locations and the score of each of the plurality of locations.

Furthermore, according to an embodiment disclosed in this disclosure, an electronic apparatus may include a communication circuit obtaining strength of a signal received from at least one access point (AP), a memory including a fingerprint DB storing fingerprints corresponding to a plurality of points and a signal fluctuation probability DB, and a processor electrically connected to the communication circuit and the memory. The processor stores similarity between first signal strength and second signal strength, which are determined based on a probability that a pair of the first signal strength and the second signal strength received from a first AP occurs with respect to fingerprints corresponding to a first point, in the signal fluctuation probability DB, obtains a fingerprint including signal strength received from the first AP, from the user terminal, and determines a location of the user terminal based on the obtained fingerprint and the signal fluctuation probability DB.

Advantageous Effects

According to embodiments disclosed in the disclosure, it is possible to provide the location measurement result of the higher accuracy by using the smaller number of fingerprints, as compared with the conventional location measurement schemes Besides, a variety of effects directly or indirectly understood through this disclosure may be provided.

MODE FOR INVENTION

Figure 1:
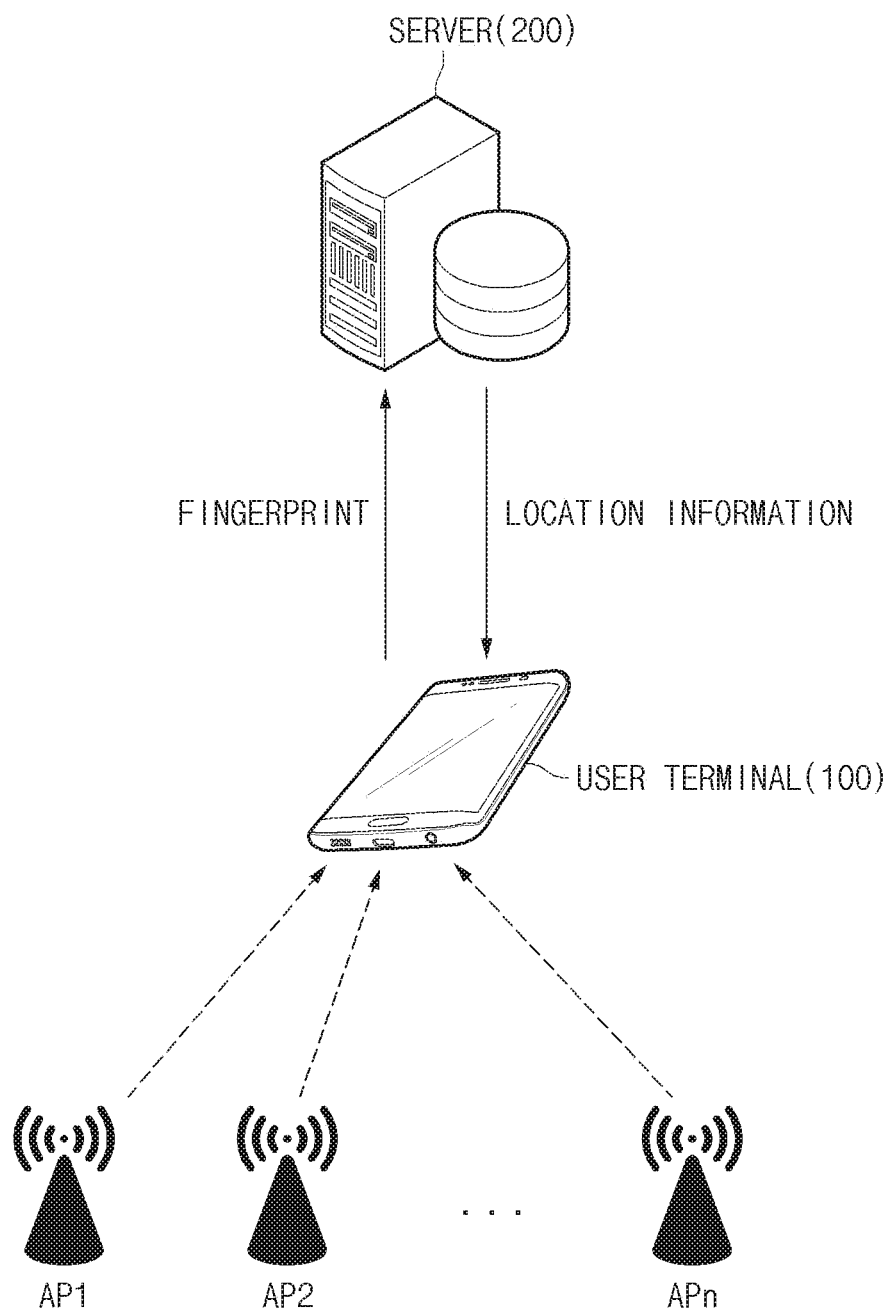
FIG. 1 illustrates a location measurement system, according to an embodiment.

FIG. 1 illustrates a location measurement system, according to an embodiment.

Referring to FIG. 1, a user terminal 100 may receive a wireless signal from an AP1 101. For example, the AP1 101 may be a Wi-Fi AP, and the user terminal 100 may receive a Wi-Fi signal from the AP1 101. However, the various embodiments disclosed in the disclosure may also be applied to an AP that transmits other wireless signals (e.g., Bluetooth, Bluetooth low energy (BLE), ZigBee, ultra wideband (UWB) signals) other than Wi-Fi. Furthermore, the user terminal 100 may be used for location measurement using the strength of a signal received from not only homogeneous APs but also heterogeneous APs (e.g., using different communication protocols). For example, all of the AP1 101, an AP2 102, and an APn 10n in FIG. 1 may be Wi-Fi APs. However, the AP1 101 may be a Wi-Fi AP, and the AP2 102 may be an AP for Bluetooth communication.

In an embodiment, the user terminal 100 may be in an indoor environment. For example, the user terminal 100 may be positioned inside a department store, a company, or a university building, in which a plurality of APs are installed. In another embodiment, the user terminal 100 may also be in an outdoor environment. For example, the user terminal 100 may also use the location measuring method described in the disclosure, in the outdoor environment in which a plurality of APs are installed, for example, an amusement park such as Disneyland or a university campus. The user terminal 100 may actively select a proper location measuring method among a location measuring method using satellite signals such as GPS and a fingerprint-based location measuring method according to various embodiments, based on the situation of the user terminal 100 or a user. For example, the user terminal 100 may use satellite signals to search for a movement destination, but may use the signal received from an AP to grasp the current location in a department store.

In an embodiment, the user terminal 100 may request a server 200 to measure the location of the user terminal 100. The request for location measurement may include information about the strength of the signal collected from each AP. In this disclosure, the information about the signal strength collected from each AP may be referred to a fingerprint. The server 200 receiving the request for location measurement from the user terminal 100 may compare the received fingerprint with a fingerprint DB pre-stored in the server 200, may determine the location of the user terminal 100 based on the comparison result, and may transmit the determined location information to the user terminal 100.

The server 200 may store fingerprint information, which is measured several times at a plurality of reference points, in advance. For example, the strength of the signal received from each of the APs at 'X' points within a predetermined place may be measured several times. For example, the strength of the signal measured at the first point five times may be the same as details illustrated in Table 1. In this exemplification, the user terminal 100 may receive a signal from four APs AP1, AP2, AP3, and AP4. In Table 1 below, it is assumed that the strength of the signal is Received Signal Strength Indication (RSSI) and the unit is dBm.

TABLE 1

|  | AP1 | AP2 | AP3 | AP4 |
| --- | --- | --- | --- | --- |
| Fingerprint 1 | −50 | −80 | −90 | −60 |
| Fingerprint 2 | −45 | −82 | −95 | −65 |
| Fingerprint 3 | −50 | −85 |  | −67 |
| Fingerprint 4 | −45 | −76 | −90 | −69 |
| Fingerprint 5 | −55 | −70 | −98 | −57 |

When the strength of the signal is collected five times at the X points located in a certain place, there may be a fingerprint table as illustrated in Table 1 for the X points. Moreover, referring to fingerprint 3 in Table 1, RSSI of −50 dBm is measured from AP1, RSSI of −85 dBm is measured from AP2, and RSSI of −67 dBm is measured from AP4. However, it is understood that the signal has not been received from AP3.

In an embodiment, the server 200 may obtain fluctuation probability between two signal strengths at each point and non-reception probability of a signal of specific signal strength at each point, using the fingerprint DB collected in advance. The obtained fluctuation probability and the obtained non-reception probability may be used to determine the current location of the user terminal 100.

Hereinafter, the configuration of the user terminal 100 and the server 200 according to an embodiment will be described with reference to FIG. 2.

Figure 2:
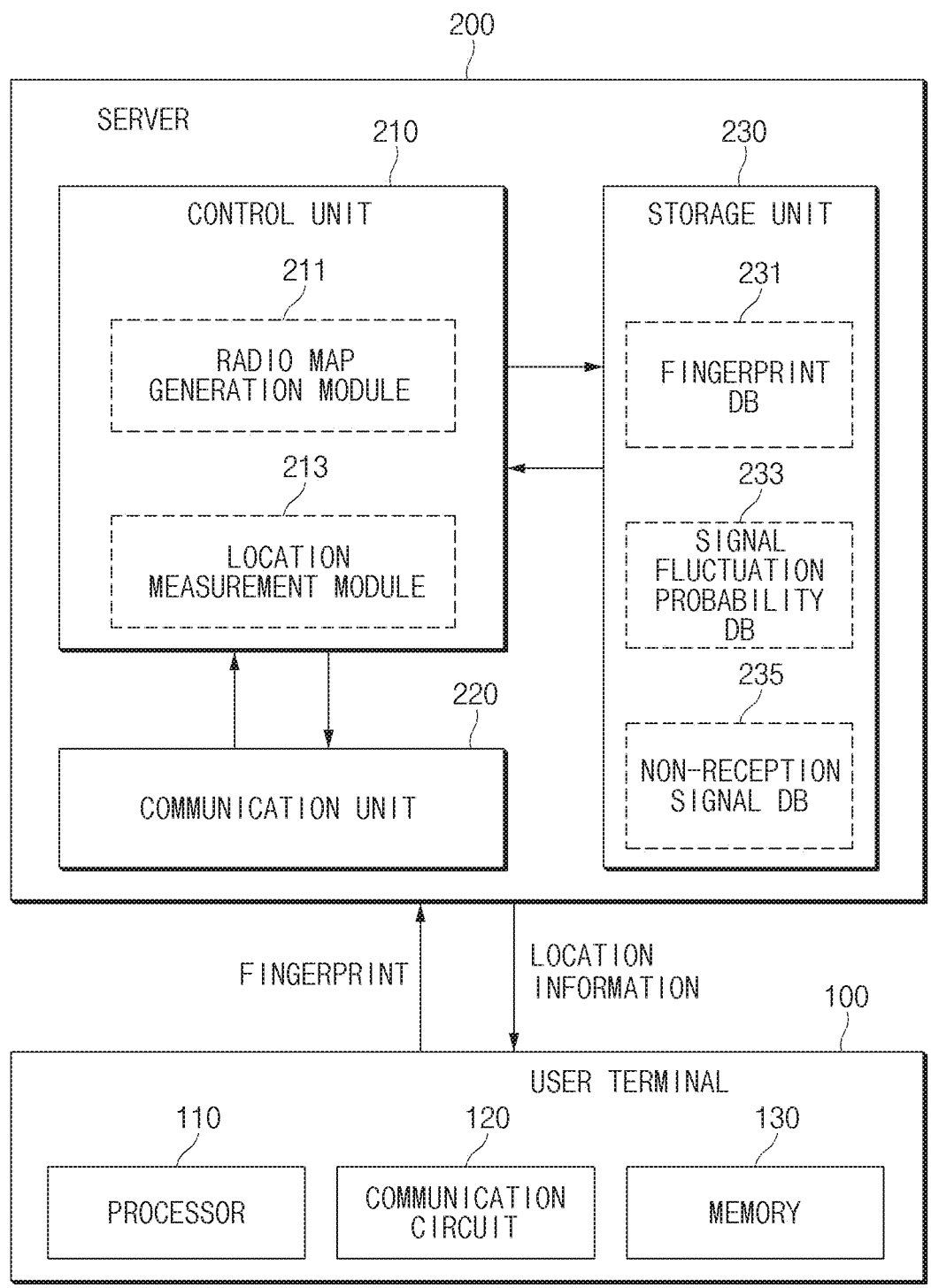
FIG. 2 illustrates an exemplary configuration of a server and the user terminal 100, according to an embodiment.

FIG. 2 illustrates an exemplary configuration of a server and the user terminal 100, according to an embodiment.

Referring to FIG. 2, the server 200 for location measurement may include a control unit 210, a communication unit 220, and a storage unit 230. The server 200 may be a single independent server or may mean a set of two or more servers.

In an embodiment, the control unit 210 may control the overall operations of the server 200. The control unit 210 may include one or more processors and it may be understood that the control unit 210 is an instruction processing unit implemented with one or more processors and a set of instructions. The control unit 210 may include a radio map generation module 211, which generates a radio map by using a plurality of collected fingerprints, and a location measurement module 213 that determines the current location of the user terminal 100 based on the fingerprint collected from the user terminal 100. The radio map generation module 211 and the location measurement module 213 may be divided as different software modules. However, the server 200 may include a processing unit generating a radio map and a processing unit performing location measurement of the user terminal 100, each of which is as an independent hardware/server.

The communication unit 220 may receive a request for location measurement from the user terminal 100. For example, when the communication unit 220 receives the fingerprint collected at the current location from the user terminal 100, the communication unit 220 may provide the collected fingerprint to the control unit 210 and may make a request for the determination of the location corresponding to the collected fingerprint.

It may be understood that the storage unit 230 is storage configured as a plurality of storage devices or a separately independent database server. The storage unit 230 may include a fingerprint DB 231, a signal fluctuation probability DB 233, and a non-reception signal DB 235. The signal fluctuation probability DB 233 and the non-reception signal DB 235 may be generated based on the fingerprint DB 231.

The location measurement module 213 may estimate the location of the user terminal 100 based on the fingerprint received from the user terminal 100 and data stored in the storage unit 230. When the location of the user terminal 100 is estimated, the location measurement module 213 may transmit the estimated location to the user terminal 100 through the communication unit 220.

In an embodiment, the user terminal 100 may measure the location by itself without using the server 200. In this case, a processor 110 of the user terminal 100 may perform an operation performed by the control unit 210 of the server 200. The DBs stored in the storage unit 230 of the server 200 may be established in a memory 130 of the user terminal 100. Moreover, because the communication with the server 200 is unnecessary, it is sufficient that a communication circuit 120 of the user terminal 100 is capable of performing a function to determine the strength of the signal received from an AP. The function (e.g., cellular communication) for communicating with the server 200 may be restricted temporarily, or the corresponding function may not be supported.

Hereinafter, referring to FIGS. 3 to 5, a method of establishing the fingerprint DB 231, the signal fluctuation probability DB 233, and the non-reception signal DB 235 and estimating the location of the user terminal 100 will be described. The descriptions in which the establishment of database and the location tracking of the user terminal 100 to be described in FIGS. 3 to 5 performed by the server 200 will be described mainly. However, as described above, it is possible for the user terminal 100 to perform the establishment of database and the location tracking. The exemplary hardware/software configuration of the user terminal 100 will be described with reference to FIGS. 7 to 9.

Figure 3:
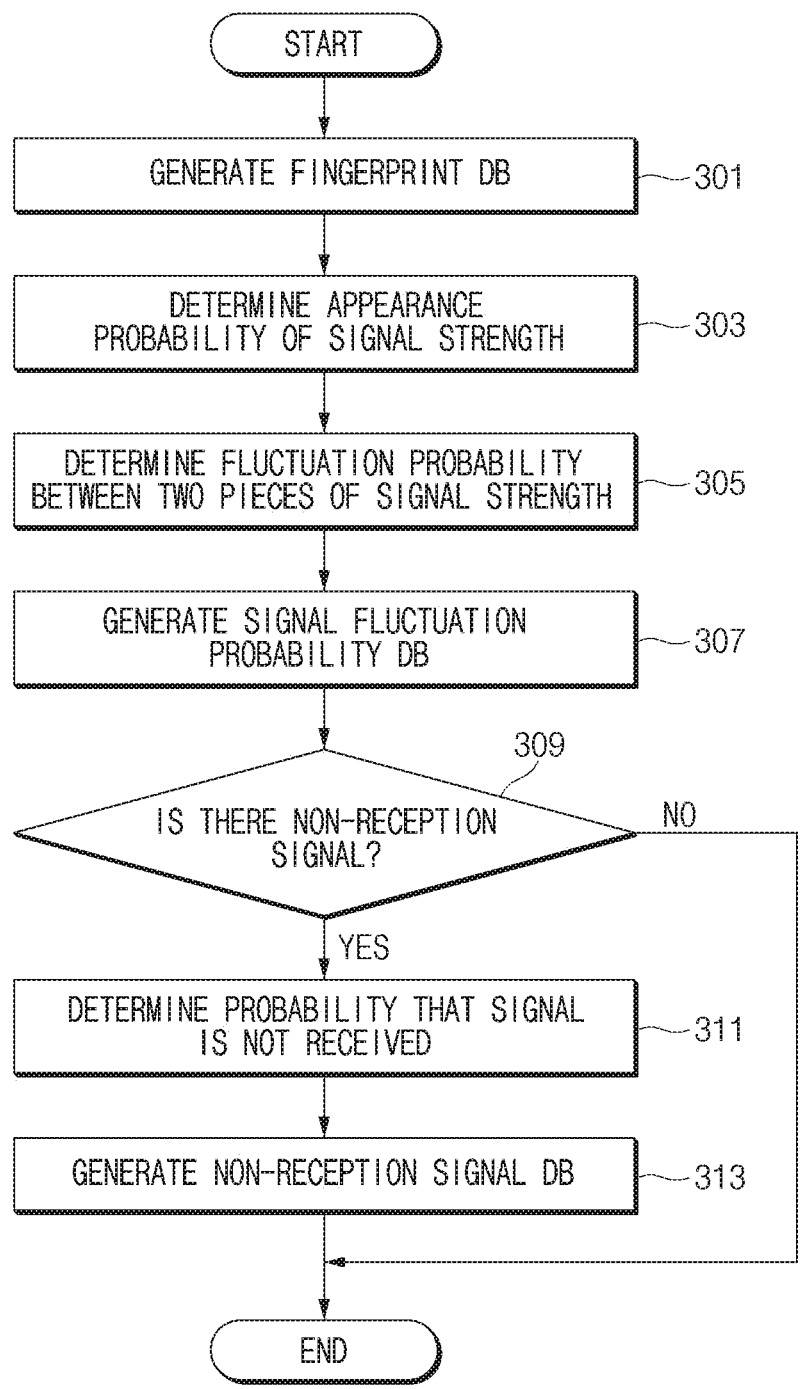
FIG. 3 illustrates a method of establishing a database, according to an embodiment.

FIG. 3 illustrates a method of establishing a database, according to an embodiment.

In operation 301, the server 200 may generate the fingerprint DB 231. For example, the server 200 may collect fingerprints for a plurality of reference locations in a place for providing a location measurement service. For example, when there are 'X' reference locations in the place and the signal strength is collected 'Y' times with respect to each of 'N' APs at each of the reference locations, there are 'X*Y*N' signal strength values in the fingerprint DB 231. In this exemplification above, the fingerprint DB 231 may include data associated with the case where the reception of a signal from an AP fails, that is, the case where the measurement of a signal strength value fails.

In an embodiment, the server 200 may use the fingerprint DB, which has been generated previously, instead of generating a new fingerprint DB. That is, because a fingerprint DB for generating a radio map is also kept in the fingerprint-based location measuring method according to the prior art, in various embodiments of the disclosure, the location measurement having the higher accuracy may be performed by using the existing DB and additionally utilizing the probability of signal fluctuation and the probability of signal non-reception, instead of newly generating a fingerprint DB.

In operation 303, the server 200 may determine appearance probability of signal strength at a specific point. For example, the appearance probability of signal strength may be defined as a frequency in which the specific strength of a signal appears compared with a frequency in which the signal strength appears at an arbitrary point. For example, the signal strength may be measured at a first point five times; when it is measured twice that the signal strength is −50 dBm, the appearance probability of −50 dBm may be 2/5.

In operation 305, the server 200 may determine the fluctuation probability between two signal strengths. The fluctuation probability may be defined as the number of combinations of two specific signal strengths compared to the number of combinations in which a pair of signal strength collected at an arbitrary point is possible.

The fluctuation probability is used to determine the similarity between the collected fingerprint and the stored fingerprint. In the case of an ideal environment, the strength of the signal received from the same AP at the same location needs to be always identical. However, in a real environment, the strength of the received signal fluctuates due to various reasons. For example, in the case where the RSSI value of −70 dBm is measured at a first point with respect to a first AP, when the measurement is repeated in the same environment, the value of about −70 dBm may be measured continuously. The value of about −70 dBm may have a high appearance frequency; as the value has the great difference from −70 dBm, the appearance frequency may decrease. In other words, the probability that the signal strength fluctuates between −70 dBm and −69 dBm may be high, but the probability that the signal strength fluctuates between −70 dBm and −100 dBm may be low. The fact that the fluctuation probability is high is interpreted as the location at which a signal is measured currently is close to a first point; the fact that the fluctuation probability is low is interpreted as the location at which a signal is measured currently is far away from the first point.

In operation 307, the server 200 may generate the signal fluctuation probability DB 233. The signal fluctuation probability DB 233 may include a probability value as it is, but may include a probability value, which is converted to log scale and/or normalized.

In operation 309, the server 200 may determine that there is a non-reception signal. For example, when the non-reception signal is included in the fingerprint DB 231, the server 200 may perform operation 311 and operation 313 for generating the non-reception signal DB 235.

In operation 311, the server 200 may determine the probability that a signal is not received. A method of determining the probability that a signal is not received may be defined similar to the method of determining the probability that a signal fluctuates. For example, the probability that a signal is not received may be understood as obtaining fluctuation probability between an effective first signal and a second signal not received. For example, when the result of measuring the signal strength at the first point with respect to AP3 five times indicates that pieces of data of −90 dBm, −95 dBm, non-reception, −90 dBm, and −98 dBm are obtained, the non-reception probability of 90 dBm, that is, the fluctuation probability between the non-reception probability of −90 dBm and non-reception may be obtained.

The non-reception probability is used to apply the penalty to an AP in which a signal is not received. For example, the possibility that a signal of the AP is not received at a point far away from an arbitrary AP may be high; even though the signal is received, the strength of the signal may be weak. Accordingly, even though the non-reception signal occurs at a point at which the strength of the signal received from the AP is weak, a penalty value may be set to be low. However, the probability that the non-reception signal occurs may be low at a point at which the strength of the signal received from the AP is strong. When all the signal strengths of AP1 in the fingerprint collected at the first point may have high RSSI values and the fingerprint obtained from the user terminal 100 includes non-reception of the signal of AP1, the server 200 may assign a high penalty to determine that the location of the user terminal 100 is not currently near AP1 (that is, is not at the first point).

In operation 313, the server 200 may generate the non-reception signal DB 235. The non-reception signal DB 235 may include the non-reception probability and the penalty value for the predetermined signal strength. As the predetermined signal strength has the higher value, the penalty value may be set to be higher.

Hereinafter, an exemplary method of determining the similarity of a fingerprint using the appearance probability of signal strength, the fluctuation probability, and the non-reception probability for signal strength will be described with reference to FIG. 4.

Figure 4:
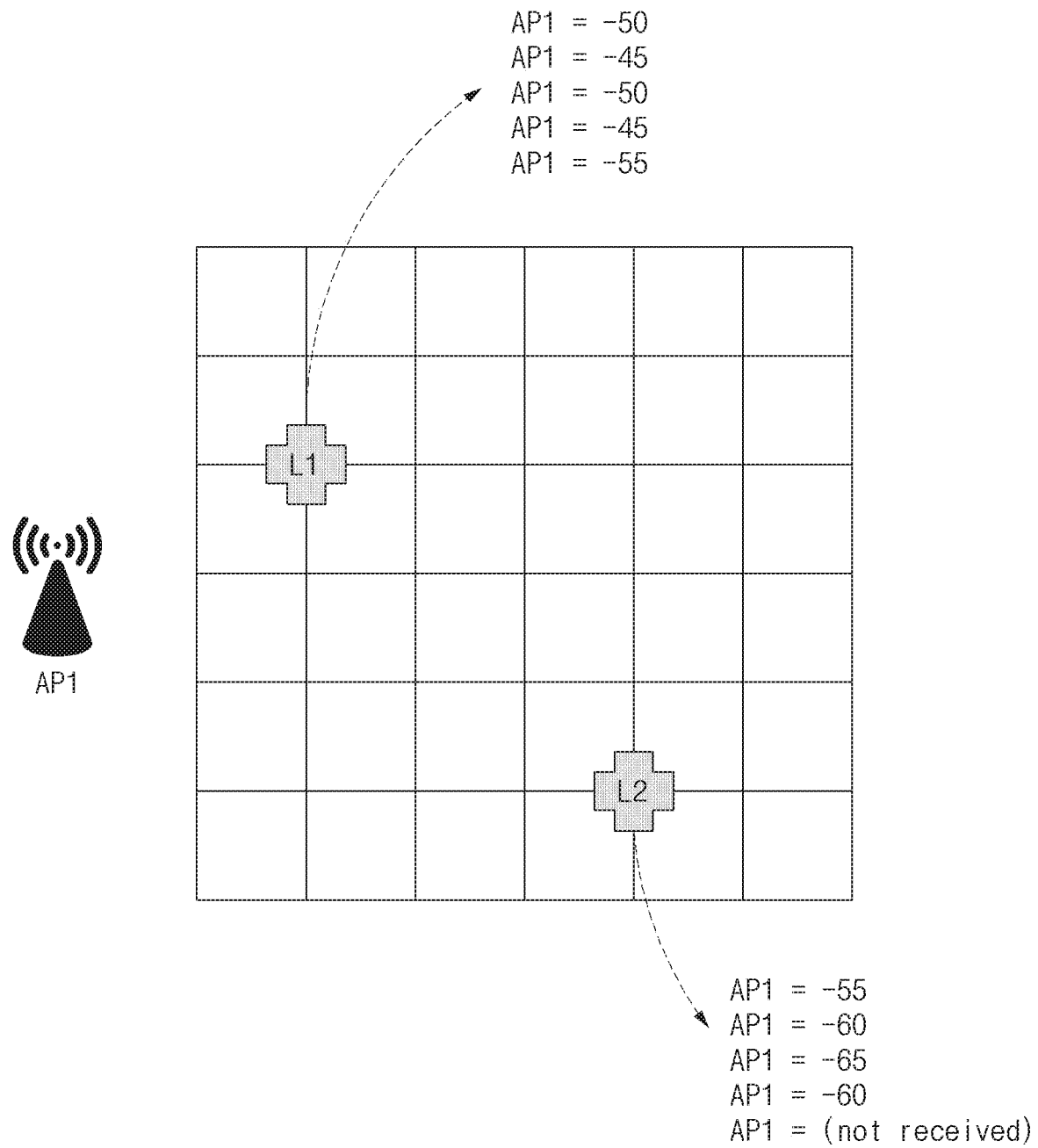
FIG. 4 illustrates exemplification for determining similarity between fingerprints based on a fingerprint of a signal received from an arbitrary AP, according to an embodiment.

FIG. 4 illustrates exemplification for determining similarity between fingerprints based on a fingerprint of a signal received from an arbitrary AP, according to an embodiment.

Referring to FIG. 4, the server 200 may have signal strength data that is measured five times at location 1 L1 and location 2 L2 with respect to AP1. With regard to AP1, RSSI values of −50, −45, −50, −45, and −55 may be measured in location 1, and RSSI values of −55, −60, −65, and −60 may be measured in location 2. The non-reception of the signal may occur once in location 2.

With regard to AN, in location 1, the signal strength appearance probability of −50 is 2/5; the signal strength appearance probability of −45 is 2/5; and the signal strength appearance probability of −55 is 1/5. Moreover, because the combination of RSSI pairs capable of being combined from the RSSI value received in location 1 with respect to AP1 is ten (5C2) and the frequency that the RSSI pair of (−50, −45) occurs is four, the fluctuation probability of the signal strength between −50 and −45 is 4/10, that is, 0.4.

According to an embodiment, the similarity $S_{ijk}$ of fingerprints i, j may be defined as follows.

$$S_{ijk} = \log\left(\frac{O_{s_{ik}s_{jk}}}{f_{s_{ik}} \cdot f_{s_{jk}}}\right) \quad \text{Equation 1}$$

Herein, $s_{ik}$ denotes the RSSI of the k-th AP. $O_{s_{ik}s_{jk}}$ denotes the signal fluctuation probability (observed frequency of fluctuation) between RSSI corresponding to $s_{ik}$ and RSSI corresponding to $s_{jk}$. $f_{s_{ik}}$ denotes the probability (i.e., signal strength appearance probability) that an RSSI value corresponding to $s_{ik}$ appears.

In the above-described exemplification of FIG. 4, $s_{ik}$, $s_{jk}$, $O_{s_{ik}s_{jk}}$, and $f_{s_{ik}}$ become −50 dBm, −45 dBm, 0.4, 0.4, and 0.4, respectively. In this exemplification, the similarity between fingerprint i and fingerprint j may be calculated as about 0.92 (=log(0.4/(0.4*0.4))).

In FIG. 4, for convenience of description, the fluctuation probability of five signal strength values collected from a single AP is calculated. However, in an embodiment, the server 200 may calculate the fluctuation probability of a plurality of signal strength values collected with respect to all APs.

In an embodiment, the signal strength fluctuation probability DB 233 may include the fluctuation probability and/or similarity of a pair of signal strength. For example, the signal strength fluctuation probability DB 233 based on fingerprints collected at a first point may be represented as illustrated in Table 2. For convenience of description, an embodiment is exemplified in Table 2 as the signal is received from two APs at the first point. However, it is reasonable that it is capable of being expanded to three or more APs.

TABLE 2

| AP | Signal strength 1 | Signal strength 2 | Fluctuation probability | Similarity |
|---|---|---|---|---|
| 1 | −90 dBm | −90 dBm | . . . | 2.76 |
| 1 | −90 dBm | −80 dBm | . . . | 0.52 |
| 1 | −90 dBm | . . . | . . . | . . . |
| 1 | . . . | . . . | . . . | . . . |
| 1 | −80 dBm | −80 dBm | . . . | 5.67 |
| 1 | −80 dBm | −70 dBm | . . . | 2.72 |
| 2 | . . . | . . . | . . . | . . . |

When fingerprint 'f' collected from the user terminal 100 has an RSSI value corresponding to −90 dBm with respect to AP1, the server 200 may calculate the similarity between fingerprint 'f' and fingerprints collected at the first point and may determine whether fingerprint 'f' is collected at the first point (or substantially near the first point). For example, when fingerprint 'f' has the RSSI value corresponding to −80 dBm with respect to AP1, the server 200 may add 0.52 that is the similarity between −90 dBm and −80 dBm and 5.67 that is the similarity between −80 dBm and −80 dBm with respect to AP1 and may take an average value. In other words, the server 200 may obtain an average similarity between fingerprint 'f' collected from the user terminal 100 and fingerprints corresponding to the first point. In this manner, the server 200 may calculate the average similarity with respect to fingerprint 'f' collected from the user terminal 100 and each of all points stored in a DB and may determine a point having the highest average similarity as the current location of the user terminal 100.

In this exemplification above, the penalty according to the non-reception of the signal may not be considered. Hereinafter, the location measuring method of the user terminal 100 considering the non-reception penalty will be described.

In an embodiment, the non-reception penalty $m_i$ may be defined as follows.

$$m_i = \log\left(\frac{P_{(i,null)}}{P_{(i)} \cdot Q_{null}}\right) \quad \text{Equation 2}$$

Herein, 'i' denotes an RSSI value. $P_{(i,null)}$ denotes the probability that non-reception of a signal occurs with respect to RSSI 'i'. $P_{(i)}$ denotes the probability that RSSI 'i' appears. $Q_{null}$ denotes the probability that the non-reception of a signal occurs. It is understood that $P_{(i,null)}$ is the signal fluctuation probability between RSSI 'i' and the non-reception of a signal.

Referring to Equation 2, as signal strength is higher in a region, $Q_{null}$ has a low value in the region. In other words, as the signal strength is higher in a region, the probability that the non-reception of a signal occurs may be lowered. Accordingly, as signal strength is higher in the region, the penalty according to the non-reception of a signal may have a great value.

In an embodiment, the non-reception signal DB 235 may include signal strength, signal non-reception probability, and/or non-reception penalty. In an embodiment, the non-reception penalty for the signal strength may be obtained as illustrated in Table 3.

TABLE 3

| AP | RSSI | Non-reception probability | Non-reception penalty |
|---|---|---|---|
| 1 | −90 dBm | ... | −0.72 |
| 1 | −85 dBm | ... | −1.56 |
| 1 | −80 dBm | ... | −2.77 |
| 1 | ... | ... | ... |
| 2 | ... | ... | ... |
| ... | ... | ... | ... |

In Table 4, the non-reception penalty is displayed as a negative value. However, this means the penalty is imposed when the signal is not received. For example, when the non-reception penalty is subtracted (−) from the obtained similarity, all the non-reception penalties may have positive values.

Hereinafter, the fingerprint-based location measuring method will be described with reference to FIG. 5.

Figure 5:
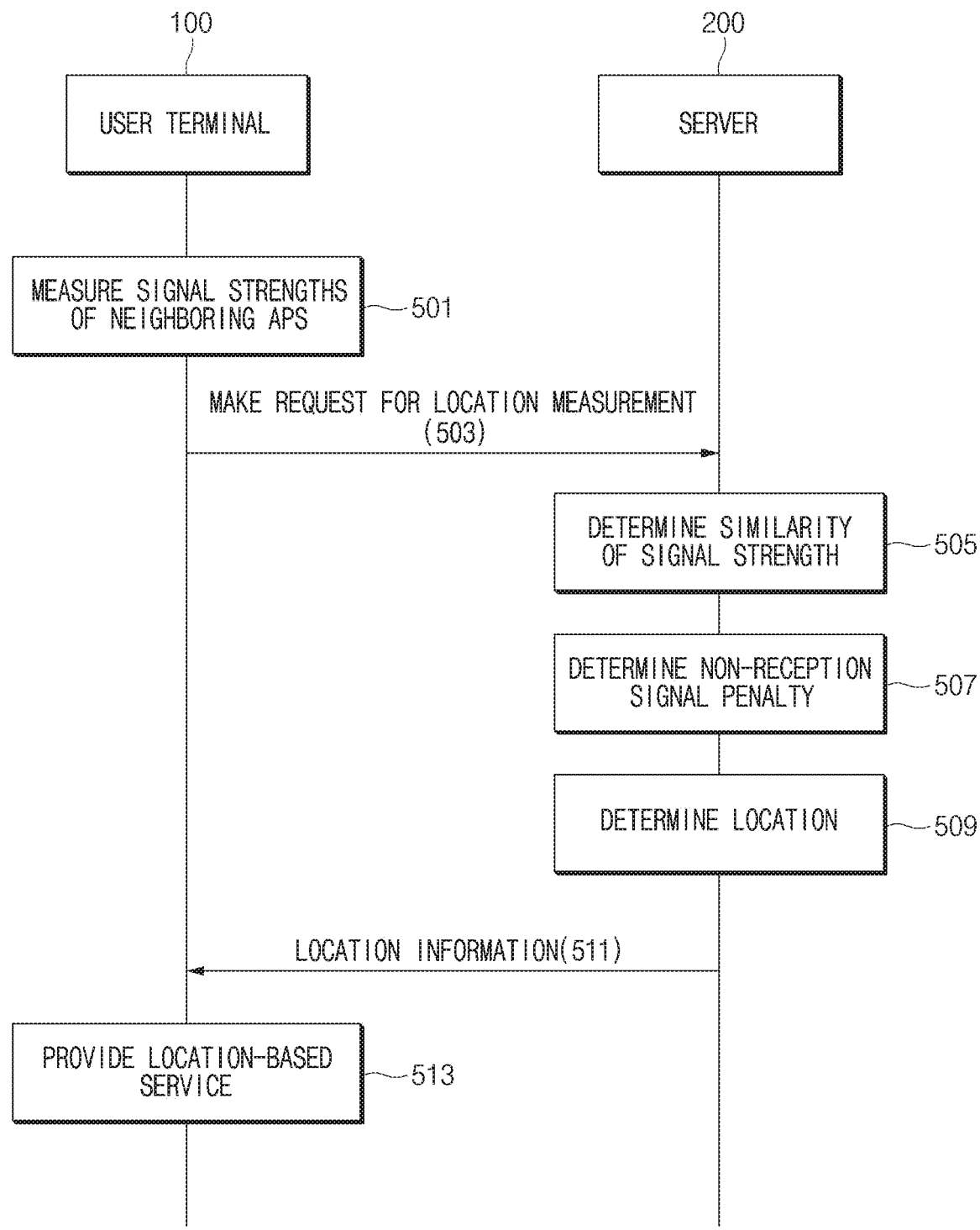
FIG. 5 illustrates a location measuring method based on similarity and a penalty, according to an embodiment.

FIG. 5 illustrates a location measuring method based on similarity and a penalty, according to an embodiment.

In operation 501, the user terminal 100 may measure signal strengths of neighboring APs. The measured signal strengths may be generated in the form of a fingerprint. For example, fingerprint 'f' generated by the user terminal 100 may be described in Table 4.

TABLE 4

| Fingerprint | AP1 | AP2 | AP3 | AP4 |
|---|---|---|---|---|
| f | −70 | −50 | −30 | null |

In operation 503, the user terminal 100 may make a request for the location measurement of the user terminal 100 to the server 200. The user terminal 100 may transmit fingerprint 'f' in Table 4 together with the request for the location measurement, to the server 200. In an embodiment, when fingerprint-based location measurement is activated, the user terminal 100 may periodically/randomly transmit only fingerprint information to the server 200 without an explicit request. When the fingerprint information is received, the server 200 may determine that the request for the location measurement is present and may perform location determination.

In operation 505 to operation 509, the server 200 may calculate the similarity and the non-reception penalty with respect to an RSSI value included in fingerprint 'f' received from the user terminal 100 and fingerprints from collecting non-reception data at a plurality of points in advance and may determine the location of the user terminal 100.

For example, ten fingerprints may be present with respect to the first point in the fingerprint DB 231 of the server 200. The server 200 may calculate the similarity with fingerprint 'f' and the non-reception penalty with respect to each of ten fingerprints corresponding to the first point and may obtain the score for the first point. Herein, the score may correspond to the average value of (the similarity between fingerprint 'f' and the first fingerprint of the first point+non-reception penalty)+(the similarity between fingerprint 'f' and the second fingerprint of the first point+non-reception penalty)+ . . . +(the similarity between fingerprint 'f' and the tenth fingerprint of the first point+non-reception penalty).

In an embodiment, the server 200 may obtain the score for each point with respect to 'X' points. In operation 509, the server 200 may determine that a point, which has the highest score, from among 'X' points is the current location of the user terminal 100.

In an embodiment, the server 200 may determine the location of the user terminal 100, based on the score determined with respect to each point and the location of each point. For example, when the score of 3 is determined with respect to the first point and when the score of 1 is determined with respect to the second point, the user terminal 100 may determine that a point (the distance from the first point is 1/3 of the distance from the second point) having the distance ratio of 3:1 is the current location of the user terminal 100 between the first point and the second point.

In operation 511, the server 200 may transmit the determined location information to the user terminal 100 100. In operation 513, the user terminal 100 100 may provide a location-based service based on the obtained location information.

Figure 6:
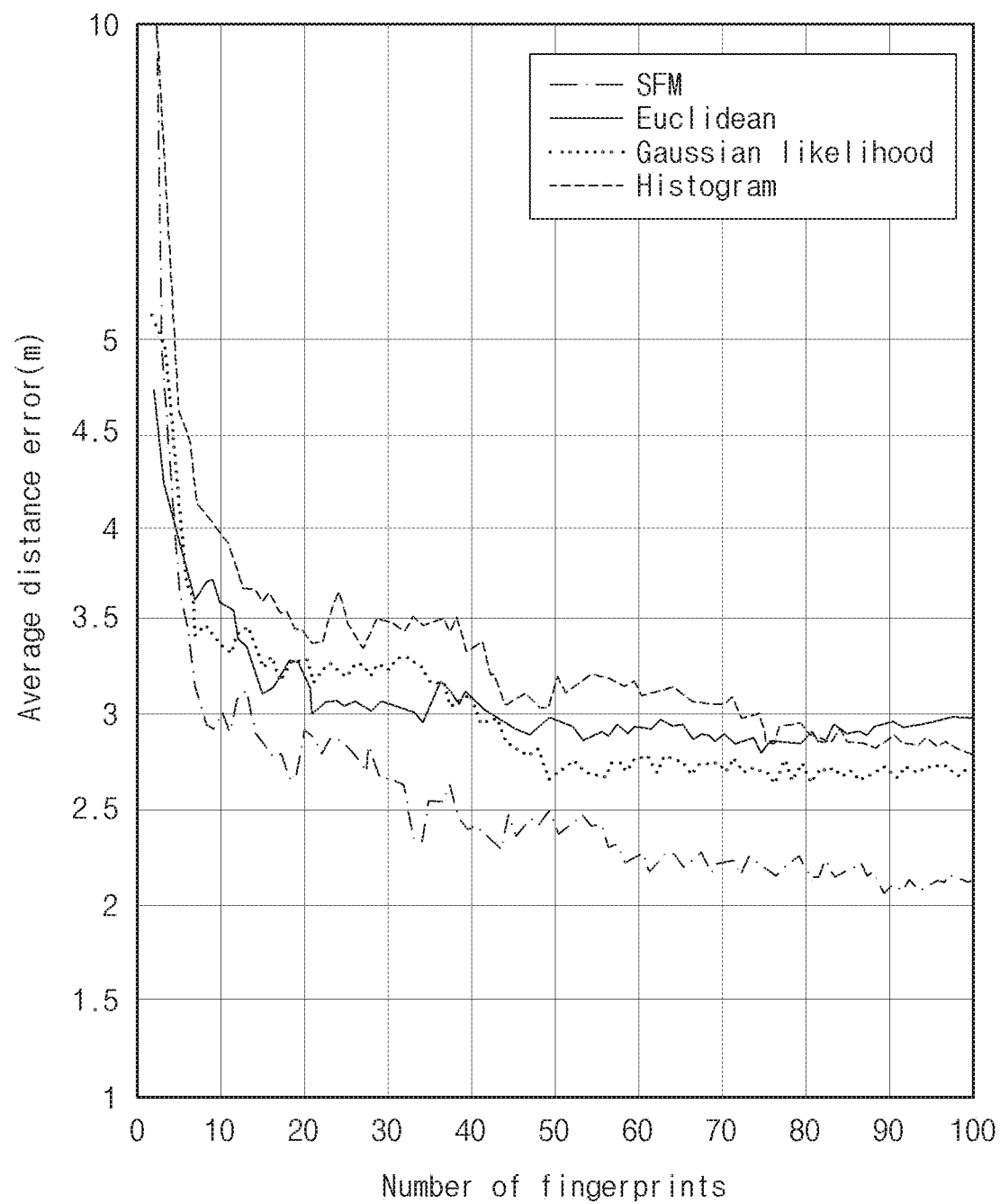
FIG. 6 is a graph indicating a difference in effect between a location measuring method according to an embodiment and a location measuring method according to the prior art.

FIG. 6 is a graph indicating a difference in effect between a location measuring method according to an embodiment and a location measuring method according to the prior art.

Referring to FIG. 6, according to a signal fluctuation matrix (SFM) method according to an embodiment, when fingerprints having the same number are used, it is understood that an average distance error is significantly low as compared with the prior art such as Euclidean, Gaussian likelihood, or histogram. Furthermore, according to an embodiment of the disclosure, the error of 3 or less may be achieved even with about ten fingerprints. However, according to an embodiment of the prior art, the error rate equivalent to that of the disclosure may be achieved when 30 to 40 or more fingerprints are kept generally. Accordingly, according to various embodiments disclosed in the disclosure, it is possible to provide high accuracy even with the smaller number of fingerprints.

Figure 7:
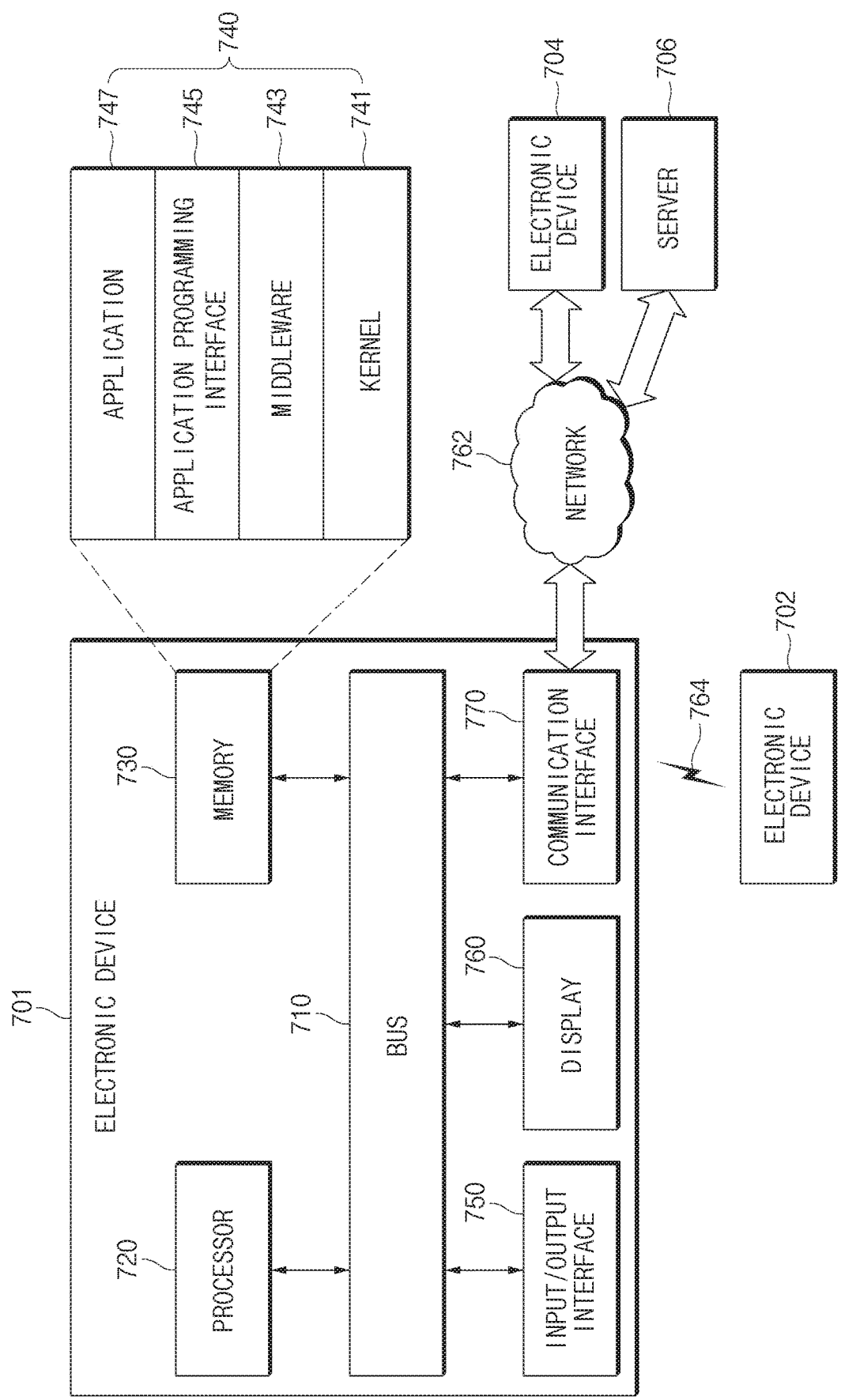
FIG. 7 illustrates an electronic device in a network environment according to an embodiment.

FIG. 7 illustrates an electronic device in a network environment system, according to various embodiments.

Referring to FIG. 7, according to various embodiments, an electronic device 701, a first electronic device 702, a second electronic device 704, or a server 706 may be connected each other over a network 762 or a short range communication 764. The electronic device 701 may include a bus 710, a processor 720, a memory 730, an input/output interface 750, a display 760, and a communication interface 770. According to an embodiment, the electronic device 701 may not include at least one of the above-described components or may further include other component(s).

For example, the bus 710 may interconnect the above-described components 710 to 770 and may include a circuit for conveying communications (e.g., a control message and/or data) among the above-described components.

The processor 720 may include one or more of a central processing unit (CPU), an application processor (AP), or a communication processor (CP). For example, the processor 720 may perform an arithmetic operation or data processing associated with control and/or communication of at least other components of the electronic device 701.

The memory 730 may include a volatile and/or nonvolatile memory. For example, the memory 730 may store commands or data associated with at least one other component(s) of the electronic device 701. According to an embodiment, the memory 730 may store software and/or a program 740. The program 740 may include, for example, a kernel 741, a middleware 743, an application programming interface (API) 745, and/or an application program (or "an application") 747. At least a part of the kernel 741, the middleware 743, or the API 745 may be referred to as an "operating system (OS)".

For example, the kernel 741 may control or manage system resources (e.g., the bus 710, the processor 720, the memory 730, and the like) that are used to execute operations or functions of other programs (e.g., the middleware 743, the API 745, and the application program 747). Furthermore, the kernel 741 may provide an interface that allows the middleware 743, the API 745, or the application program 747 to access discrete components of the electronic device 701 so as to control or manage system resources.

The middleware 743 may perform, for example, a mediation role such that the API 745 or the application program 747 communicates with the kernel 741 to exchange data.

Furthermore, the middleware 743 may process task requests received from the application program 747 according to a priority. For example, the middleware 743 may assign the priority, which makes it possible to use a system resource (e.g., the bus 710, the processor 720, the memory 730, or the like) of the electronic device 701, to at least one of the application program 747. For example, the middleware 743 may process the one or more task requests according to the priority assigned to the at least one, which makes it possible to perform scheduling or load balancing on the one or more task requests.

The API 745 may be, for example, an interface through which the application program 747 controls a function provided by the kernel 741 or the middleware 743, and may include, for example, at least one interface or function (e.g., an instruction) for a file control, a window control, image processing, a character control, or the like.

The input/output interface 750 may play a role, for example, of an interface which transmits a command or data input from a user or another external device, to other component(s) of the electronic device 701. Furthermore, the input/output interface 750 may output a command or data, received from other component(s) of the electronic device 701, to a user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may display, for example, various contents (e.g., a text, an image, a video, an icon, a symbol, and the like) to a user. The display 760 may include a touch screen and may receive, for example, a touch, gesture, proximity, or hovering input using an electronic pen or a part of a user's body.

For example, the communication interface 770 may establish communication between the electronic device 701 and an external device (e.g., the first electronic device 702, the second electronic device 704, or the server 706). For example, the communication interface 770 may be connected to the network 762 over wireless communication or wired communication to communicate with the external device (e.g., the second electronic device 704 or the server 706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 764. The short range communication 764 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 762 may include at least one of telecommunications networks, for example, a computer network (e.g., LAN or WAN), an Internet, or a telephone network.

Each of the first and second electronic devices 702 and 704 may be a device of which the type is different from or the same as that of the electronic device 701. According to an embodiment, the server 706 may include a group of one or more servers. According to various embodiments, all or a portion of operations that the electronic device 701 will perform may be executed by another or plural electronic devices (e.g., the first electronic device 702, the second electronic device 704 or the server 706). According to an embodiment, in the case where the electronic device 701 executes any function or service automatically or in response to a request, the electronic device 701 may not perform the function or the service internally, but, alternatively additionally, it may request at least a portion of a function associated with the electronic device 701 from another device (e.g., the electronic device 702 or 704 or the server 706). The other electronic device may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Figure 8:
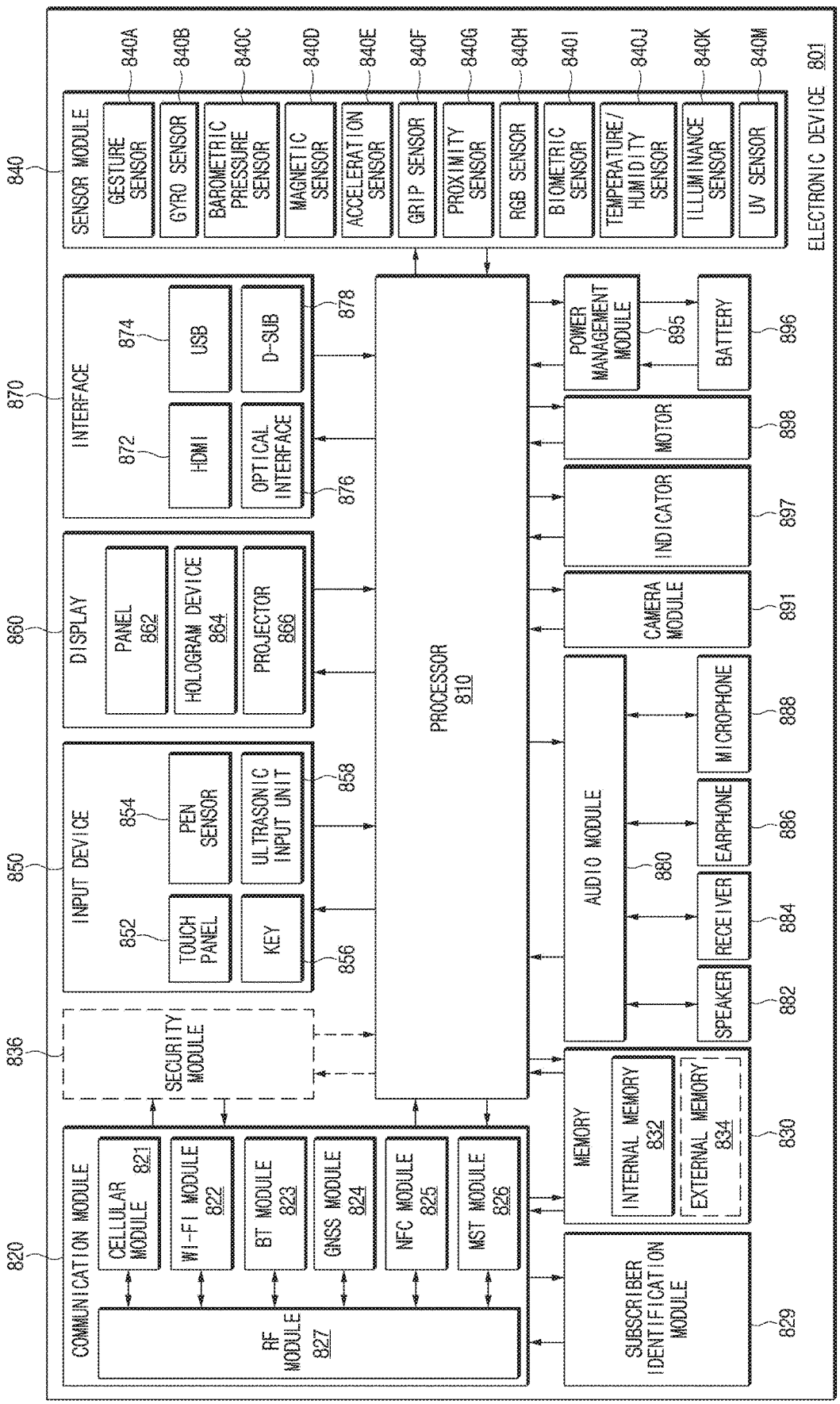
FIG. 8 illustrates a block diagram of an electronic device according to an embodiment.

FIG. 8 illustrates a block diagram of an electronic device, according to various embodiments.

Referring to FIG. 8, an electronic device 801 may include, for example, all or a part of the electronic device 701 illustrated in FIG. 7. The electronic device 801 may include one or more processors (e.g., an application processor (AP)) 810, a communication module 820, a subscriber identification module 829, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application to control a plurality of hardware or software components connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of components illustrated in FIG. 8. The processor 810 may load a command or data, which is received from at least one of other components (e.g., a nonvolatile memory), into a volatile memory and process the loaded command or data. The processor 810 may store a variety of data in the nonvolatile memory.

The communication module 820 may be configured the same as or similar to the communication interface 770 of FIG. 7. The communication module 820 may include the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 730) may include an internal memory 832 or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module that includes a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on java card open platform (JCOP) OS.

The sensor module 840 may measure, for example, a physical quantity or may detect an operation state of the electronic device 801. The sensor module 840 may convert the measured or detected information to an electric signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or alternatively, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 760) may include a panel 862, a hologram device 864, or a projector 866. The panel 862 may be the same as or similar to the display 760 illustrated in FIG. 7. The panel 862 may be implemented, for example, to be flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature (D-sub) 878. The interface 870 may be included, for example, in the communication interface 770 illustrated in FIG. 7. Additionally or alternatively, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a component of the audio module 880 may be included, for example, in the input/output interface 750 illustrated in FIG. 7. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 9:
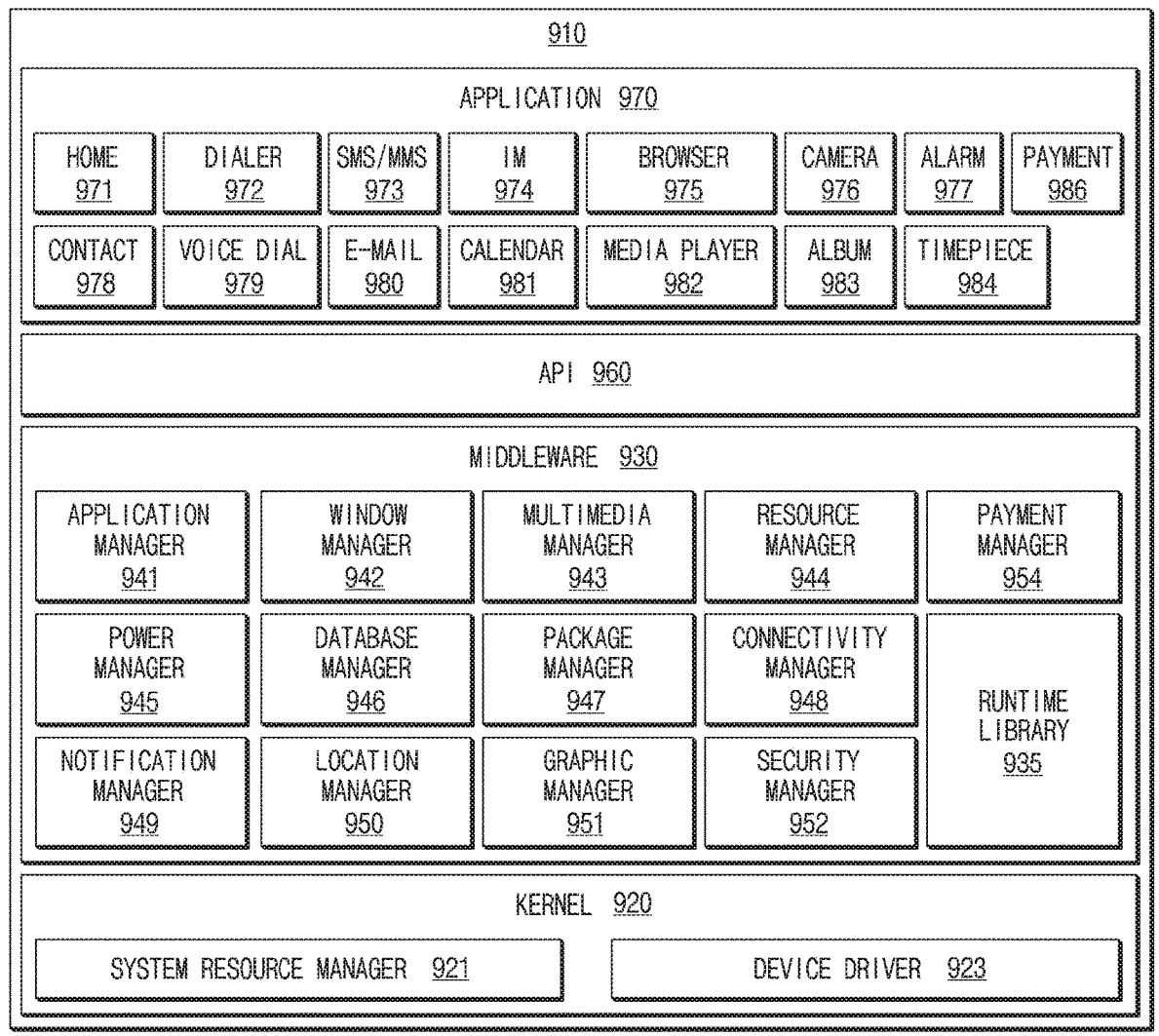
FIG. 9 illustrates a block diagram of a program module according to an embodiment.

FIG. 9 illustrates a block diagram of a program module, according to various embodiments.

According to an embodiment, a program module 910 (e.g., the program 740) may include an operating system (OS) to control resources associated with an electronic device (e.g., the electronic device 701), and/or diverse applications (e.g., the application program 747) driven on the OS. The OS may be, for example, Android™ iOS™, Windows™, Symbian™, or Tizen™.

The program module 910 may include a kernel 920, a middleware 930, an application programming interface (API) 960, and/or an application 970. At least a portion of the program module 910 may be preloaded on an electronic device or may be downloadable from an external electronic device (e.g., the first electronic device 702, the second electronic device 704, the server 706, or the like).

The kernel 920 (e.g., the kernel 741) may include, for example, a system resource manager 921 or a device driver 923. The system resource manager 921 may perform control, allocation, or retrieval of system resources. According to an embodiment, the system resource manager 921 may include a process managing unit, a memory managing unit, or a file system managing unit. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 701) includes a telephony function, the middleware 930 may further include a telephony manager for managing a voice or video call function of the electronic device.

The middleware 930 may include a middleware module that combines diverse functions of the above-described components. The middleware 930 may provide a module specialized to each OS kind to provide differentiated functions. Additionally, the middleware 930 may dynamically remove a part of the preexisting components or may add new components thereto.

The API 960 (e.g., the API 745) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 970 (e.g., the application program 747) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, or a timepiece 984, or for offering health care (e.g., measuring an exercise quantity, blood sugar, or the like) or environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 701) and an external electronic device (e.g., the first electronic device 702 or the second electronic device 704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device (e.g., the first electronic device 702, the second electronic device 704, or the server 706). According to an embodiment, the application 970 may include a preloaded application or a third party application that is downloadable from a server. The names of components of the program module 910 according to the embodiment may be modifiable depending on kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor (e.g., the processor 720). At least a portion of the program module 910 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 730), may cause the one or more processors to perform a function corresponding to the instruction. The computer-readable storage media, for example, may be the memory 730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A server comprising:
a communication circuit configured to communicate with a user terminal;
a storage including a fingerprint database (DB) storing fingerprints corresponding to a plurality of points and a signal fluctuation probability DB; and
a processor electrically connected to the communication circuit and the storage,
wherein the processor is configured to:
determine a similarity between a first signal strength and a second signal strength received from a first access point (AP) at a first location, based on a first probability of an occurrence of a pair of the first signal strength and the second signal strength being received from the first AP at the first location,
store the similarity between the first signal strength and the second signal strength including the first probability in the signal fluctuation probability DB as corresponding to a first location,
obtain, from the user terminal, a fingerprint including signal strength received from the first AP that is received by the user terminal, and
determine whether a location of the user terminal corresponds to the first location based on the obtained fingerprint and the signal fluctuation probability DB.

2. The server of claim 1, wherein the processor is configured to cause the communication circuit to transmit the determined location to the user terminal.

3. The server of claim 1,
wherein the first AP is a wireless fidelity (Wi-Fi) AP, and
wherein the signal strength corresponds to a received signal strength indication (RSSI).

4. The server of claim 1, wherein the processor is further configured to determine the similarity based on an appearance probability of the first signal strength and an appearance probability of the second signal strength, and a probability that a pair of the first signal strength and the second signal strength appears.

5. The server of claim 4, wherein the processor is further configured to determine the similarity based on a number of times that the pair of the first signal strength and the second signal strength occurs, compared with a number of signal strength pairs capable of being combined with respect to the first AP, with respect to the fingerprints corresponding to the first location.

6. The server of claim 5, wherein the processor is further configured to determine the similarity based on a value obtained by dividing a probability that the pair of the first signal strength and the second signal strength occurs by a value obtained by multiplying the appearance probability of the first signal strength and the appearance probability of the second signal strength.

7. The server of claim 1,
wherein the storage further includes a non-reception signal DB, and
wherein the processor is further configured to store a non-reception signal penalty determined based on a probability that the pair of first signal strength and the second signal strength received from the first AP and a non-reception signal occurs with respect to the fingerprints corresponding to the first location, in the non-reception signal DB.

8. The server of claim 7, wherein the non-reception signal penalty is set to be higher as a value of the first signal strength is greater.

9. The server of claim 7, wherein the processor is further configured to determine the location of the user terminal based on the obtained fingerprint, the signal fluctuation probability DB, and the non-reception signal DB.

10. A location measuring method of a server, the method comprising:
obtaining, from a terminal, a fingerprint including a first signal strength value and a second signal strength value of a first access point (AP);
obtaining a score of each of a plurality of locations based on a probability of occurrence of a pair of the first signal strength value and the second signal strength value and a probability of occurrence of pairs of signal strength values of the first AP included in fingerprints corresponding to the plurality of locations; and
determining a location, from among the plurality of locations, of the obtained fingerprint based on the plurality of locations and the score of each of the plurality of locations.

11. The method of claim 10, further comprising:
transmitting the determined location to the terminal.

12. The method of claim 10,
wherein the obtained fingerprint includes non-reception signal information of a signal from a second AP, and
wherein the obtaining of the score of each of the plurality of locations is based on a penalty of a signal strength value of the second AP included in the fingerprints corresponding to the plurality of locations that include the non-reception signal information.

13. The method of claim 12, wherein the penalty is higher as the signal strength value of the second AP is greater.

14. The method of claim 10, wherein the determining of the location is based on a location corresponding to a highest score among the plurality of locations, as the location of the terminal.

15. The method of claim 10, wherein the determining of the location includes determining the location of the terminal, using at least two or more locations among the plurality of locations and scores corresponding to the at least two or more locations.

* * * * *